(12) United States Patent
Radlinski et al.

(10) Patent No.: US 8,380,723 B2
(45) Date of Patent: Feb. 19, 2013

(54) QUERY INTENT IN INFORMATION RETRIEVAL

(75) Inventors: Filip Radlinski, Cambridge (GB); Martin Szummer, Cambridge (GB); Nick Craswell, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 164 days.

(21) Appl. No.: 12/784,869

(22) Filed: May 21, 2010

(65) Prior Publication Data

US 2011/0289063 A1    Nov. 24, 2011

(51) Int. Cl.
    *G06F 17/30*     (2006.01)
(52) U.S. Cl. ........................................... 707/748
(58) Field of Classification Search .......... 707/736, 707/737, 748
See application file for complete search history.

(56) References Cited

U.S. PATENT DOCUMENTS

| | | | | |
|---|---|---|---|---|
| 5,542,090 | A * | 7/1996 | Henderson et al. | 707/999.006 |
| 5,950,189 | A * | 9/1999 | Cohen et al. | 707/999.003 |
| 7,401,087 | B2 * | 7/2008 | Copperman et al. | 707/737 |
| 2005/0060290 | A1 * | 3/2005 | Herscovici et al. | 707/3 |
| 2005/0102259 | A1 * | 5/2005 | Kapur | 707/1 |
| 2005/0203878 | A1 * | 9/2005 | Brill et al. | 707/3 |
| 2008/0140699 | A1 | 6/2008 | Jones et al. | |
| 2008/0244428 | A1 | 10/2008 | Fain | |
| 2008/0256056 | A1 * | 10/2008 | Chang et al. | 707/5 |
| 2009/0043749 | A1 | 2/2009 | Garg et al. | |
| 2010/0082605 | A1 | 4/2010 | Dupret et al. | |
| 2010/0211588 | A1 * | 8/2010 | Jiang et al. | 707/768 |
| 2010/0306229 | A1 * | 12/2010 | Timm et al. | 707/767 |
| 2011/0119269 | A1 * | 5/2011 | Agrawal et al. | 707/737 |

OTHER PUBLICATIONS

Beeferman, et al., "Agglomerative clustering of a search engine query log", ACM, Proceedings of the International Conference on Knowledge Discovery and Data Mining (KDD), Boston, MA, 2000, pp. 407-416.

Blonde!, et al., "Fast unfolding of communities in large networks", retrieved from <<http://arxiv.org/PS_cache/arxiv/pdf/0803/0803.0476v2.pdf>>, Journal of Statistical Mechanics, Jul. 25, 2008, pp. 1-12.

Clough, et al., "Multiple Approaches to Analysing Query Diversity", retrieved on Apr. 17, 2010 at <<http://ir.shef.ac.uk/cloughie/papers/pp1519-clough.pdf>>, ACM, Proceedings of the International Conference on Research and Development in Information Retrieval, Jul. 19, 2009, pp. 734-735.

Craswell, et al., "Random Walks on the Click Graph", ACM, Proceedings of the International Conference on Research and Development in Information Retrieval, Amsterdam, Jul. 23, 2007, pp. 239-246.

(Continued)

*Primary Examiner* — Jorge A Casanova
(74) *Attorney, Agent, or Firm* — Zete Law, P.L.L.C.; MacLane C. Key (57) ABSTRACT

Inferring query intent in information retrieval is described. In an example reformulations of an initial query by a user are used to create a query neighborhood. In the example, the query neighborhood is used to identify a set of possibly related queries. First and higher order reformulations of the initial query may be used to expand the query neighborhood. In an example precision can be improved by reducing the query neighborhood to more closely related queries for example, two queries can be connected if they are often clicked for the same document. In an example two queries can be connected using a random walk and all pairs of queries that are not connected by a random walk of less than a fixed threshold are removed. The connected queries can be used to form clusters and weights can be applied in order to determine the most likely related queries.

18 Claims, 10 Drawing Sheets

OTHER PUBLICATIONS

Dang, et al., "Query Reformulation Using Anchor Text", retrieved on Apr. 17, 2010 at http://maroo.cs.umass.edu/pub/web/getpdf.php?id=900>>, ACM, Proceedings of the International Conference on Web Search and Data Mining (WSDM), New York City, NY, Feb. 4, 2010, pp. 41-50.

Daume, et al., "Web Search Intent Induction via Automatic Query Reformulation", retrieved on Apr. 17, 2010 at <<http://www.aclweb.org/anthology/N/N04/N04-4013.pdf>>, Association for Computational Linguistics, Proceedings of Human Language Technology Conference (HLT-NAACL), Boston, MA, 2004, pp. 49-52.

Piwowarski, et al., "Mining User Web Search Activity with Layered Bayesian Networks or How to Capture a Click in its Context", retrieved on Apr. 17, 2010 at http://www.wsdm2009.org/papers/p162-piwowarski.pdf, ACM, Proceedings of the International Conference on Web Search and Data Mining (WSDM), Barcelona, ES, 2009, pp. 162-171.

Syed, et al., "Adapting to the Shifting Intent of Search Queries", retrieved on Apr. 17, 2010 at <<,http://www.cis.upenn.edu/~usyed/SyedSlivkinsMishraNIPS2009.pdf>>, Advances in Neural Information Processing Systems (NIPS), 2009, pp. 1-9.

Teevan, et al., "Characterizing the Value of Personalizing Search", ACM, Proceedings of the International Conference on Research and Development in Information Retrieval, Amsterdam, Jul. 23, 2007, pp. 757-758.

Veilumuthu, et al., "Intent Based Clustering of Search Engine Query Log", retrieved on Apr. 19, 2010 at <<http://ieeexplore.ieee.org/stamp/stamp.jsp?tp=&arnumber=5234156>>, IEEE Conference on Automation Science and Engineering, Bangalore, IN, Aug. 22, 2009, pp. 647-652.

\* cited by examiner

QUERY INTENT IN INFORMATION RETRIEVAL

BACKGROUND

Different users may submit the same query to an information retrieval system and yet have different intents or meanings for their query. For example the query "jaguar" may be input with the intention of finding information about Jaguar cats or about luxury motor vehicles. Also, queries such as "machine learning" often conceal multiple intents: users may be looking for an overview of modern techniques, downloadable tools or theoretical results. In addition, queries which use acronyms are ambiguous because the acronym may stand for many different things. Real users also often mistype queries. However, information retrieval systems often have little or no mechanism for determining query intent and thus the information retrieved by the system is not relevant to the query input by the user.

Web search systems are an example of one type of information retrieval system. Users submit a query to the web search system and obtain a list of results that are relevant to the entered query. However, web search queries are often ambiguous or unclear. Different users may have different intents for the same query. The results that are returned may not be relevant to the query intent of a particular user.

In order to evaluate information retrieval systems human judges are often used to infer the intent of a query and then to judge how relevant a document is to that intent. However, it is difficult, even for human users, to infer the intent of queries which are ambiguous or unclear. This is because the human user needs to be familiar with a huge range of topics, cultures and motivations in order to infer query intent.

There is an ongoing need to improve the relevance of items retrieved by information retrieval systems such as web search systems. The embodiments described below are not limited to implementations which solve any or all of the disadvantages of known information retrieval systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Inferring query intent in information retrieval is described. In an example reformulations of an initial query by a user are used to create a query neighborhood. In the example, the query neighborhood is used to identify a set of possibly related queries. First and higher order reformulations of the initial query may be used to expand the query neighborhood. In an example precision can be improved by reducing the query neighborhood to more closely related queries for example, two queries can be connected if they are often clicked for the same document. In an example two queries can be connected using a random walk and all pairs of queries that are not connected by a random walk of less than a fixed threshold are removed. The connected queries can be used to form clusters and weights can be applied in order to determine the most likely related queries.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a web search system, the system described is provided as an example and not a limitation. As those skilled in the art will appreciate, the present examples are suitable for application in a variety of different types of information retrieval systems.

The term "document" is used herein to refer to any item of information which may be retrieved using a query server or search engine. A non-exhaustive list of examples is: photograph, digital image, file, email message, voice mail message, short message service message, text-based post at a social networking service, web page, part of a web page, map, electronic ink, commercial product, video, multimedia file, song, album, news article, database record or a part or summary of one or more of these items.

Figure 1:
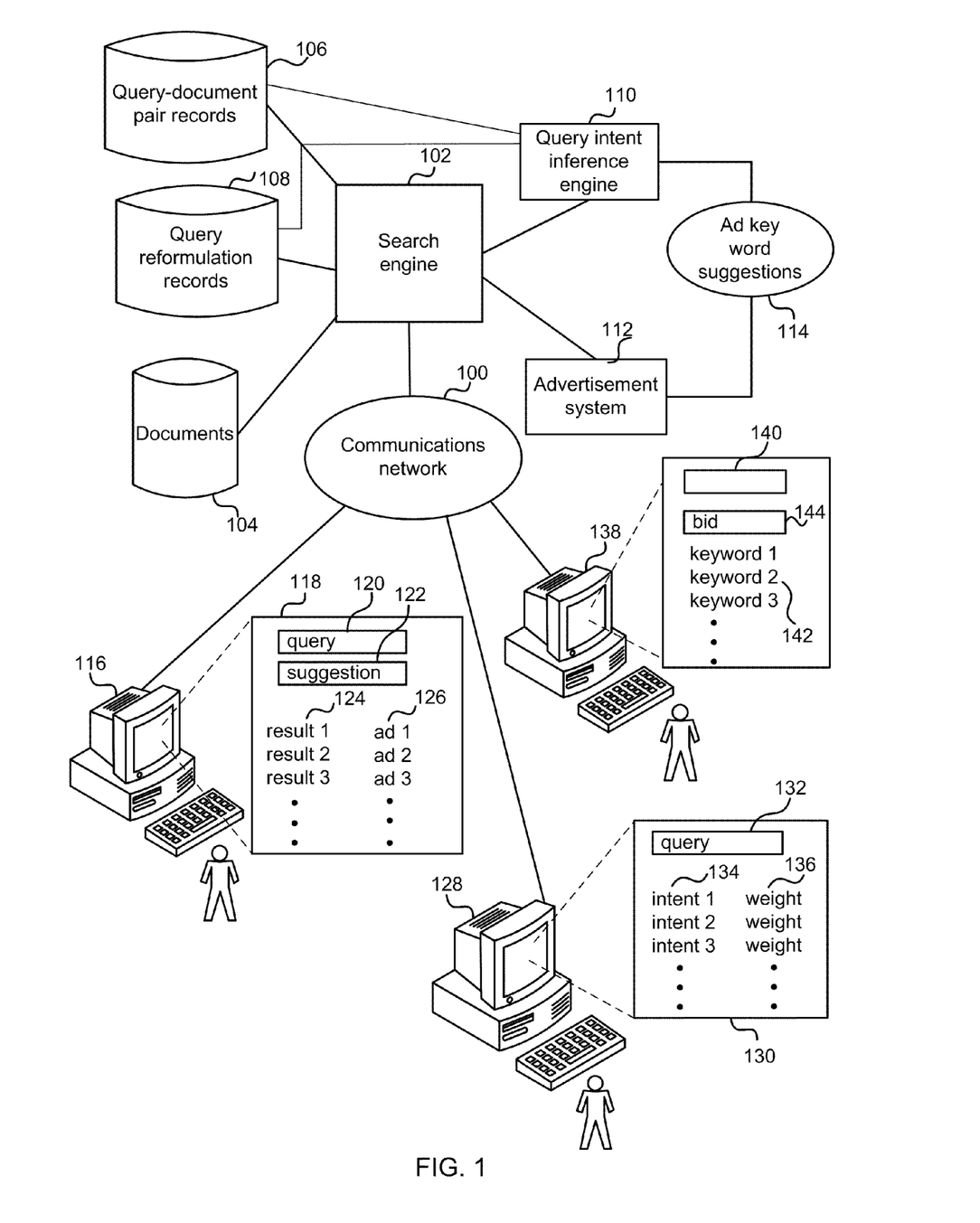
FIG. 1 is a schematic diagram of an example information retrieval system.

FIG. 1 is a schematic diagram of an information retrieval system accessed using a communications network 100. In an example an information retrieval system comprises a search engine 102 which is arranged to retrieve a ranked list of documents which may be stored at a document database 104 or elsewhere on the communications network 100. The search engine 102 is arranged to access a database or other store 106 of query-document pair records and a store 108 of query reformulation records. The search engine comprises or is connected to a query intent inference engine 110 which is able to access the store 106 of query-document pair records and the store 108 of query reformulation records. The information retrieval system may optionally comprise an advertisement system 112 which may be used with the query intent inference engine 110 to find advertisement keyword suggestions 114.

The communications network 100 may be any appropriate network. A non exhaustive list of examples of appropriate networks is: Local Area Networks (LAN), Wide Area Networks (WAN), Public Switched Telephone Networks (PSTN), the Internet and Virtual Private Networks (VPN). The network 100 may be a wireless network or a wired network or combinations thereof. In the examples described herein the search engine is a web search engine. However, in other examples the search engine may be a desktop search engine, media search engine or other appropriate search engine.

Using the communications network 100 a user is able to access the search engine 102, for example, using a web browser or other suitable access interface. The search engine is of any suitable type arranged to rank documents from the database 104 on the basis of the relevance of those documents to user input search terms. Those user input search terms are also referred to as a query. For example, the search engine is arranged to analyze user search terms and generate a rank or weighting for documents 104 on the basis of user input search terms. The search engine may then provide an ordered list of the documents (or links to the documents) based on the ranking.

In order to assess the relevance of a document to a particular query an approach is to first infer the intent of a query. Different users may have different intents for the same query. For example a user inputting the query "House", may be searching for information about residential buildings, information about a television show of that name or other information unconnected to either.

As mentioned above, the search engine 102 is able to access a database or other store 106 of query-document pair records. A query-document pair record comprises stored information about a query and a document associated with that query. For example, the query may be user input search terms or anchor text. For example, the document may be associated with a query as a result of a user actively clicking a link for that document in a results list obtained as a result of inputting the query to a search engine. In other cases, instead of active "clicks" association may result from a user moving a mouse, a finger, their gaze, or other user interface device over a link to that document for at least a specified time. In an example the query-document pair records are stored at the database 106 using a click graph data structure comprising nodes connected by edges, each node representing any of a document and a query and each edge representing at least one observed click.

In another example the queries are anchor text. Typically, the anchor text, link label or link title is the visible, clickable text in a hyperlink. The words contained in anchor text may determine the ranking that an associated web page will receive by search engines. Anchor text usually gives the user relevant descriptive or contextual information about the content of the link's destination. The anchor text may or may not be related to the actual text of the URL of the link. For example, a hyperlink to an English-language Encyclopedia homepage might take this form:
<a href="http://en.encyclopedia.org/encyc/Main_ Page"> Encyclopedia</a> The anchor text in this example is "Encyclopedia"; the unwieldy URL http://en.encyclopedia.org/encyc/Main_Page displays on the web page as Encyclopedia, contributing to clean, easy-to-read text.

In the case that the queries are anchor text then the database 106 of query-document pair records may comprise a graph data structure similar to a click graph. In this case each node represents either a document or anchor text and each edge connects a document node to an anchor text node where the anchor text occurs in an observed link to that document.

As mentioned above, the search engine has access to a store 108 of query reformulation records. A reformulation of a first query is a second query that is assumed to be semantically related to the first query or to have been issued by one or more users seeking to find the same information. In an example, a query reformulation may be a frequently observed follow-on query made by a single user during a single search session within a specified time period. In another example, a query reformulation may be any query issued by any user in a specified geographical location within a specified time period. Thus the particular criteria used to identify queries as query reformulations may vary and some different examples are now given to illustrate this.

In some embodiments described herein, a query reformulation is taken to be a valid reformulation (and then recorded in the store 108) provided that the following criteria are met. A valid reformulation may be a query made by each of at least two distinct users, followed within a specified time period by another query which is the same for each user. The number of distinct users and the time period may be adjusted according to the particular application domain.

The database 106 of query-document pair records may be maintained by the search engine such that as user clicks and other data is observed during use of the information retrieval system the database 106 is dynamically updated. In this way trends and changes in query intentions may be taken into account so that the system is able to give high quality results. However, this is not essential, the query-document pair records may be updated using an off-line process or a batch-process or in any other way by any suitable entity. The store 108 of query reformulation records 108 may also be maintained by the search engine 102 or any other entity as for the database 106.

The query intent inference engine 110 may use data from the query-document pair record database 106 and query reformulation record store 108 in order to identify queries related to a received query. Further information on how the data from the query-document pair records and query reformulation records is used to suggest or generate queries related to the received query is given below.

The information retrieval system may additionally comprise an advertisement system 112. For example the advertisement system 112 may be a contextual advertisement system. Contextual advertising can be used by search engines to display advertisements on their search results pages based on specific search terms (keywords) in the user's query. In another example a contextual advertising system scans the text of a website for keywords and returns advertisements to the webpage based on what the user is viewing. For example, if the user enters a query relating to a sport the user may see advertisements for sports-related companies, such as memorabilia dealers or ticket sellers. In an example advertisers can bid for the right to present an advertisement with specific keywords in an open auction. When one of these keywords is entered into the search engine, the results of the auction on that keyword are presented, with higher ranking bids appearing more prominently on the page. The query intent inference engine 110 may be used in order to identify keywords associated with the users entered query and provide further advertisement keyword suggestions 114. This is described in more detail below.

In an example a user at a first computer-implemented device 116 may use a Graphical User Interface (GUI) 118 to submit a query 120 to the information retrieval system in order to find relevant search results. The information retrieval system may provide at least one of; a suggestion 122 of a reformulated query, ranked search results 124 and a plurality of relevant advertisement 126. The information provided to the user may be based on information provided to the search engine by the query intent inference engine 110. For example, a user may enter the query "House" and may receive a ranked list of query suggestions 122 from the query intent inference engine 110. For example the query suggestions in this case may be "House TV show" and "Residential estate agents".

In another example a user at a second device 128 may wish to determine possible alternative meanings of a submitted query. The user operates GUI 130 to submit a query 132 to the information retrieval system. The information retrieval system may provide a plurality of possible query intents 134 ranked according to calculated weights 136 of each of the intents. The weights may be calculated by the query intent inference engine 110 as described in more detail below.

In a further example a user at a third device 138 may wish to purchase advertising key words. The user submits information 140 to the information retrieval system. The information may be an advertisement, a keyword the user is interested in bidding for or other appropriate information. The user receives a plurality of ranked advertisement keywords 142. Bids 144 can then be submitted for the keywords based on the ranking. For example an advertiser may submit a keyword that they are interested in bidding for, the query intent inference 110 engine may be used to find a plurality of associated keywords based on the original keyword submitted by the advertiser. The advertisement system 112 may rank the advertisement keyword suggestions 114 according to, in a non-exhaustive list of examples; a relevance weighting from the system, the current highest received bid, known click-through rates or other appropriate ranking method.

The devices 116, 128, 138 may comprise any appropriate computer-based device. A non-exhaustive list of suitable devices is; a desktop computer, a laptop computer, a tablet PC, a PDA, a telephone device, a hand-held gaming device. Although three example devices are shown in FIG. 1 it should be noted that these are merely illustrative examples. The information retrieval system may be accessed by a plurality of users either simultaneously or at different times using any appropriate device.

Figure 2:
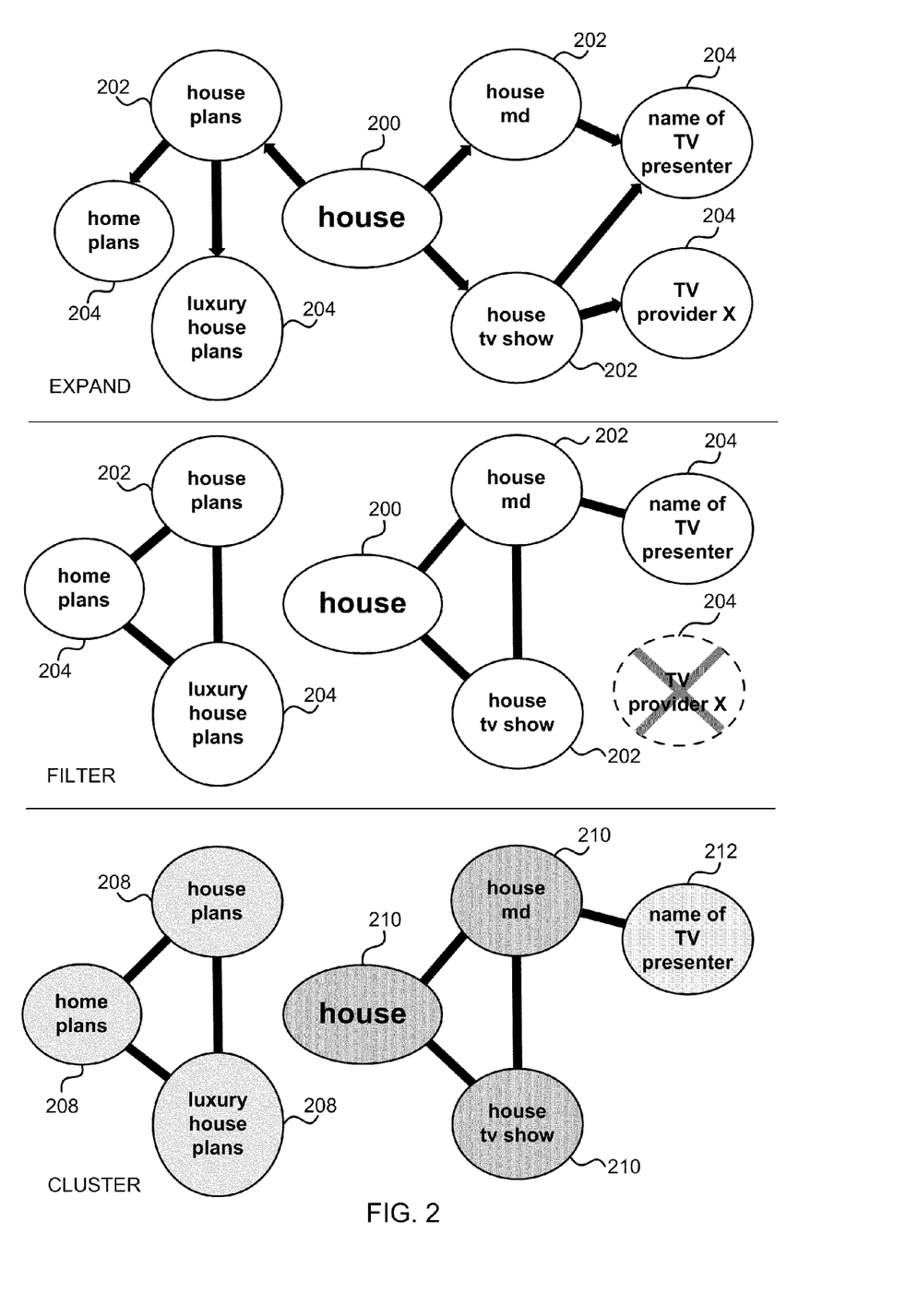
FIG. 2 is a schematic diagram of query intent identification.

FIG. 2 is a schematic diagram of query intent identification which schematically illustrates how the query intent inference engine 110 operates. A user may submit an input query 200 to an information retrieval system. For example the user enters the query "house". The query intent inference engine 110 is arranged to form a query neighborhood which may be a graph data structure as illustrated in the top section of FIG. 2. This is achieved by expanding the possible interpretations of the input query by identifying a first plurality of possibly related queries to the input query 200. These are referred to as "first reformulations" for clarity. In an example the first reformulations are identified by examining frequent reformulations 202 of the original query 200 "house". For example first reformulations 202 of the original query 200 "house" may be "house plans", "house MD" or "house TV show". The query neighborhood can be further expanded by including frequent reformulations 204 of the first reformulations 202. These are referred to as "second reformulations" for clarity. For example second reformulations of "house plans" may be "home plans" or "luxury house plans", second reformulations of "house TV show" may be "TV provider X" or "name of TV star" and a second reformulation of "house MD" may also be "name of TV star". Higher order reformulations may optionally be included in the query neighborhood.

The query neighborhood at this stage is noisy and often comprises related queries that do not describe what the input query actually meant. In order to address this the query intent inference engine 110 is arranged to intelligently filter or modify the query neighborhood to create a reformulation graph as illustrated in the middle section of FIG. 2. In order to do this the query intent inference engine 110 uses evidence about queries that are related to the input query 200. This evidence comprises the database of query-document pair records 106. For example, if the evidence indicates that a given pair of queries is highly related then this pair may be linked in the reformulation graph; otherwise links between those queries in the reformulation graph are omitted.

For example, the query-document pair records may be used to measure a degree of similarity between two queries. Where the query-document pair records are stored using a graph data structure a random walk process on that graph data structure may be used to provide the similarity measure. Any suitable random walk process may be used such as a forwards random walk process or a backwards random walk process. Other measures of similarity may also be used such as distance measures, first passage time of a random walk, measures based on graph conductance, average walk length and Jaccard similarity coefficients between sets of adjacent nodes. In some embodiments, the query-document pair records are stored as a bipartite query-document click graph. The click graph is a bipartite graph comprising nodes connected by edges. The click graph is formed from two types of nodes; nodes representing queries and nodes representing documents. An edge connects a query and a document if one or more clicks have been observed for that query document pair by any user. The edge may be weighted according to the total number of clicks from all users although this is not essential. Two queries can be connected if they are often clicked on for the same documents.

In the example of FIG. 2 the query intent inference engine 110 may obtain a random walk similarity measure for each pair of queries from the reformulation graph. Edges between nodes are maintained where that similarity measure is above a specified threshold. For example, in FIG. 2, an edge is added between the nodes "home plans" and "luxury house plans". Edges are removed between the nodes "house" and "house plans" as well as between "house tv show" and "name of TV star" and between "house tv show" and "TV provider X" since the measure of similarity for those pairs of queries is not above the threshold.

The process of forming the reformulation graph may also comprise removing connected groups of nodes which are smaller than a specified size. In the example of FIG. 2 the node "TV provider X" is removed for this reason.

The query intent inference engine is optionally arranged to carry out clustering of the nodes in the reformulation graph to produce clusters as illustrated in the bottom section of FIG. 2. The measure of similarity between the pairs of queries (such as the random walk similarity measure from the click graph) may be used to find clusters referred to herein as "intent clusters". Any appropriate clustering method may be used such as k-means clustering or others. An example of an appropriate clustering method can be found in V D. Blondel, J.-L. Guillaume, R. Lambiotte, and E. Lefebre. "Fast unfolding of community hierarchies in large networks". Journal of Statistical Mechanics, 2008 which is incorporated herein by reference in its entirety.

In the example of FIG. 2 three intent clusters are produced. A cluster comprising "house plans", "home plans" and "luxury house plans" 208; a cluster comprising "house", "house TV show" and "house MD" 210 and a cluster comprising a single query "name of TV star" 212. Each intent cluster can be thought of as representing a particular intention of a user making a search for information. The individual queries in a cluster can be thought of as alternative queries that may be used for the particular intention of the cluster.

As mentioned above the query neighborhood comprises noise and taken alone does not provide good quality query intent inference ability. The query-document pair information is also by its nature, noisy and sparse. This noise and sparsity in the query-document pair information makes it hard to use that information to assist in information retrieval. However, by combining the reformulation data (captured in the query neighborhood) with data from the query-document pair records it is possible to obtain high quality results. The particular data structures used to store and combine the data enable the results to be obtained efficiently and in a manner which scales up successfully. This is beneficial for web applications such as web-based information retrieval where the amounts of data involved are enormous.

Figure 3:
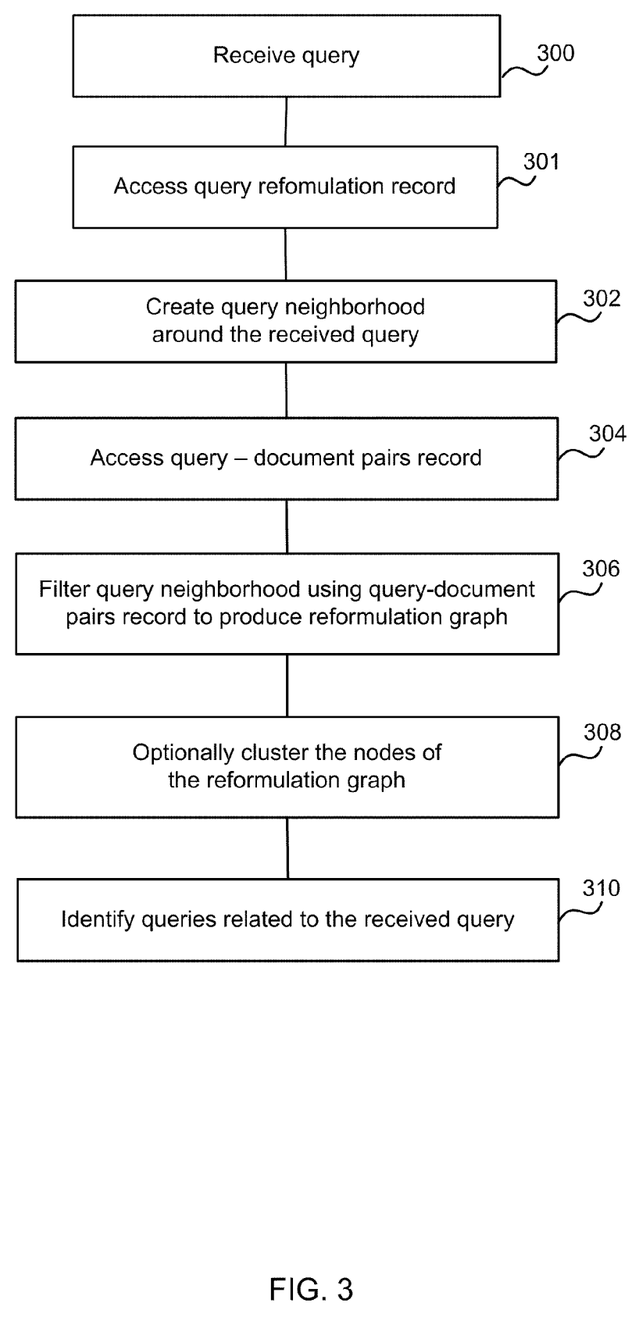
FIG. 3 is a flow diagram of an example method of query intent identification.

FIG. 3 is a flow diagram of a method at a query intent inference engine 110. A query is received 300 and a query reformulation record accessed 301 for that query. A query neighborhood is created 302 for the received query and a query-document pairs record is accessed 304. The query-document pairs record is used to filter 306 the query neighborhood to produce a reformulation graph. Optionally the nodes of the reformulation graph are clustered 308. Queries related to the received query can then be identified 310 by using the reformulation graph or the clusters.

Creating 302 a query neighborhood is described in more detail with reference to FIG. 4. An example click graph is described with reference to FIG. 5. Using the query-document pair records to filter 306 the query neighborhood to produce a reformulation graph is described in more detail with reference to FIG. 6 and FIG. 7. Identifying 310 queries related to the received query is described in more detail with reference to FIG. 8 and FIG. 9

Figure 4:
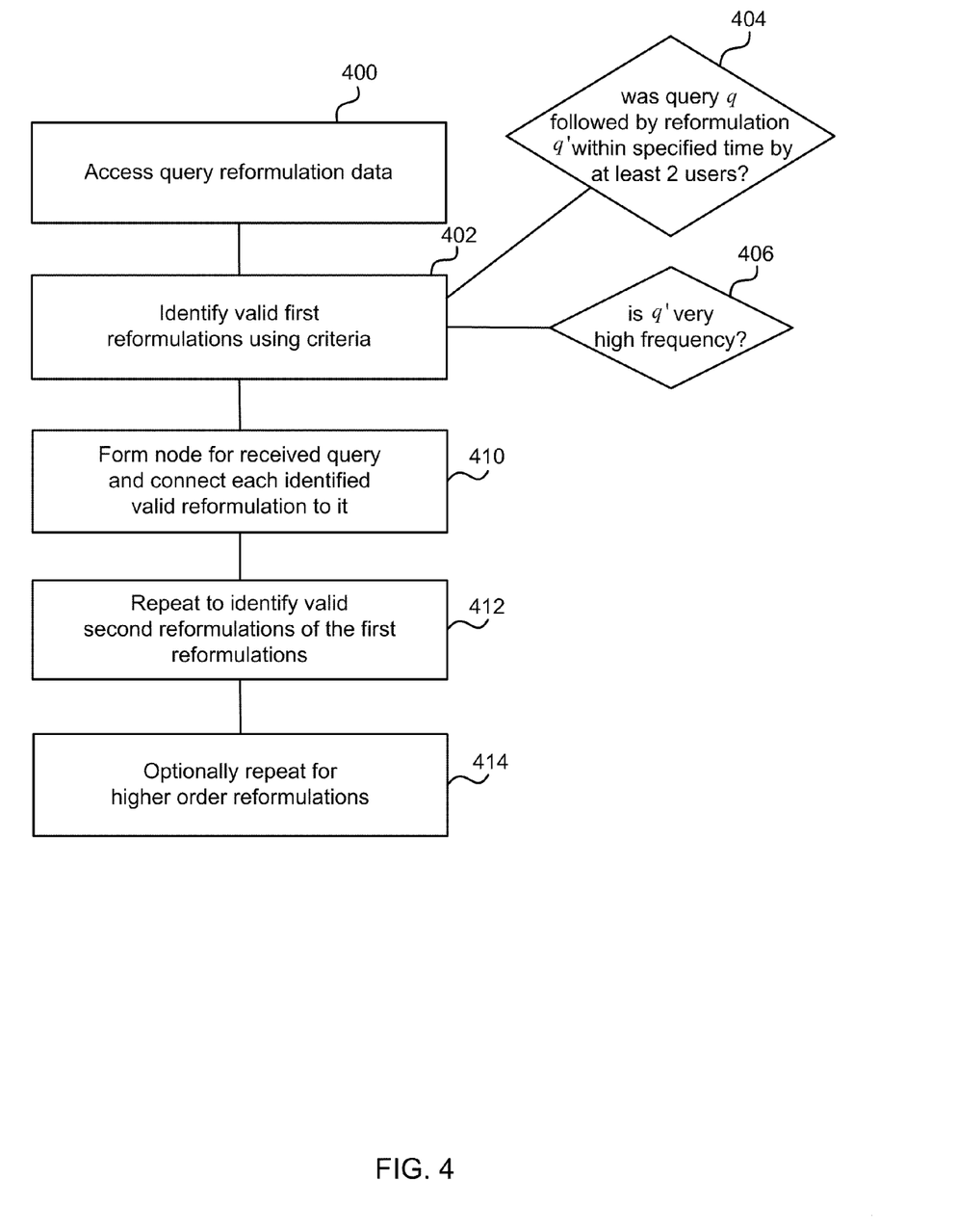
FIG. 4 is a flow diagram of an example method of creating and expanding a query neighborhood.

FIG. 4 is a flow diagram of creating a query neighborhood. The query reformulation data is accessed 400. Valid first reformulations are identified 402 using one or more criteria. A non-exhaustive list of examples of criteria is: was a query q followed 404 by reformulation q' within a specified time by at least two users? Is q' very high frequency 406? However, any suitable criteria may be used to identify valid reformulations. A node is formed for the received query (i.e. the input query) and each identified 410 valid reformulation is connected to it. Valid second reformulations of the first reformulations can then be identified 412 using criteria in a similar manner to identifying the first valid reformulations. Optionally 414 higher order reformulations can also be identified. The reformulations are used to create a query neighborhood 302.

An example of an appropriate criterion for assessing valid reformulations is if within 10 minutes q was followed by q' by at least two separate users. Another example of an appropriate criterion for assessing valid reformulations is: of all pairs of queries $(q_i, q')$ issued by any user within 10 minutes (or any other appropriate time period) the pair (q, q') occurred at least a fraction δ of the time. For example δ=0.001. The latter example avoids very frequent queries appearing as valid reformulations for all queries. For example a frequent query that may often follow another query within a short period of time but which may not be associated with the earlier query is a search for webmail or social networking sites.

As described above, once the query neighborhood has been created the query-document pair records may be accessed 304 and used to filter 306 the query neighborhood in order to produce the reformulation graph. In some embodiments the query-document pair records comprise a click graph. An example of a click graph is now described with reference to FIG. 5.

Figure 5:
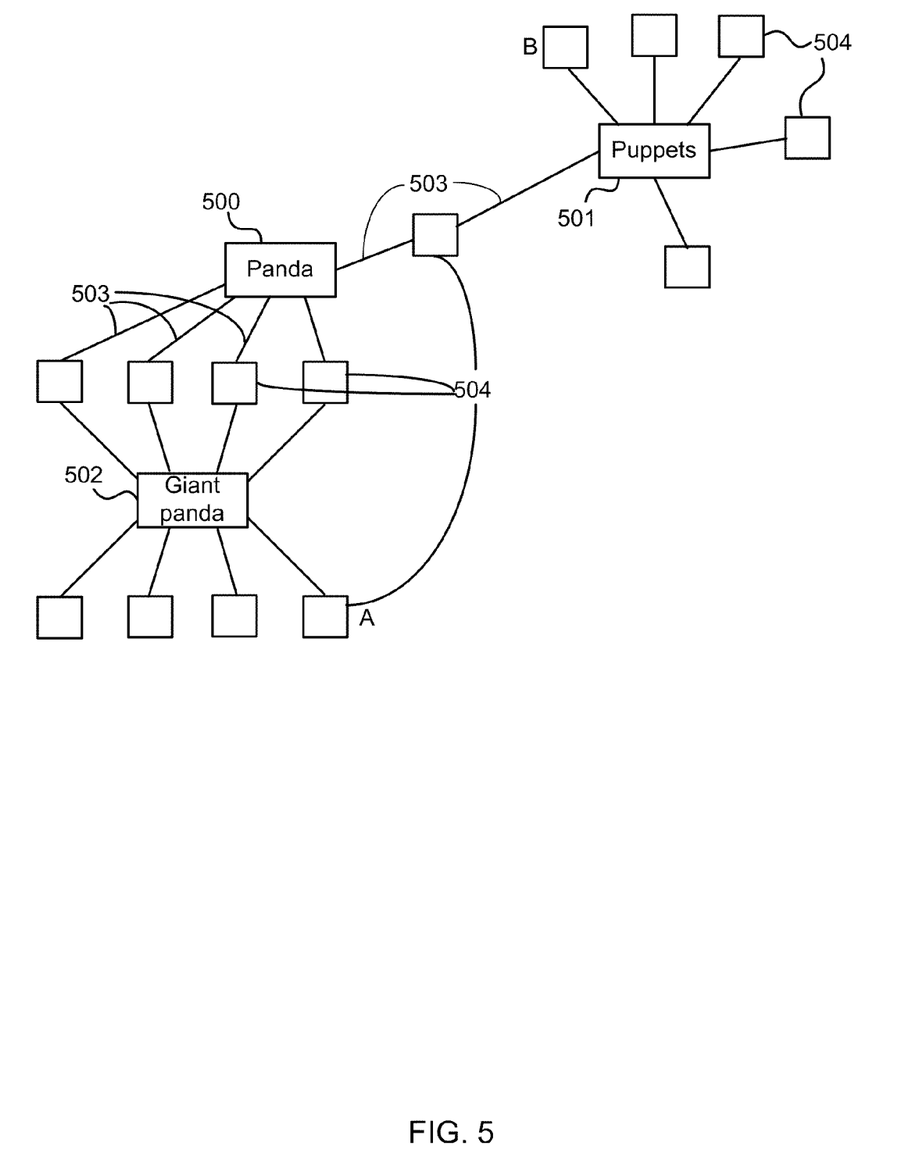
FIG. 5 is a schematic diagram of an example click graph.

FIG. 5 is a schematic diagram of an example click graph. Queries are represented by a first type of node and in this example, there are three query nodes, 500, 501, 502. Documents are represented by another type of node 504 and in this example, the documents are all images. The nodes are interconnected by edges 503 as mentioned above. The click graph of this example comprises a small number of nodes and edges although in practice many more nodes and edges may be present. The click graph represents clicks made by many different users rather than clicks observed during long search sessions observed for only one user.

Figure 6:
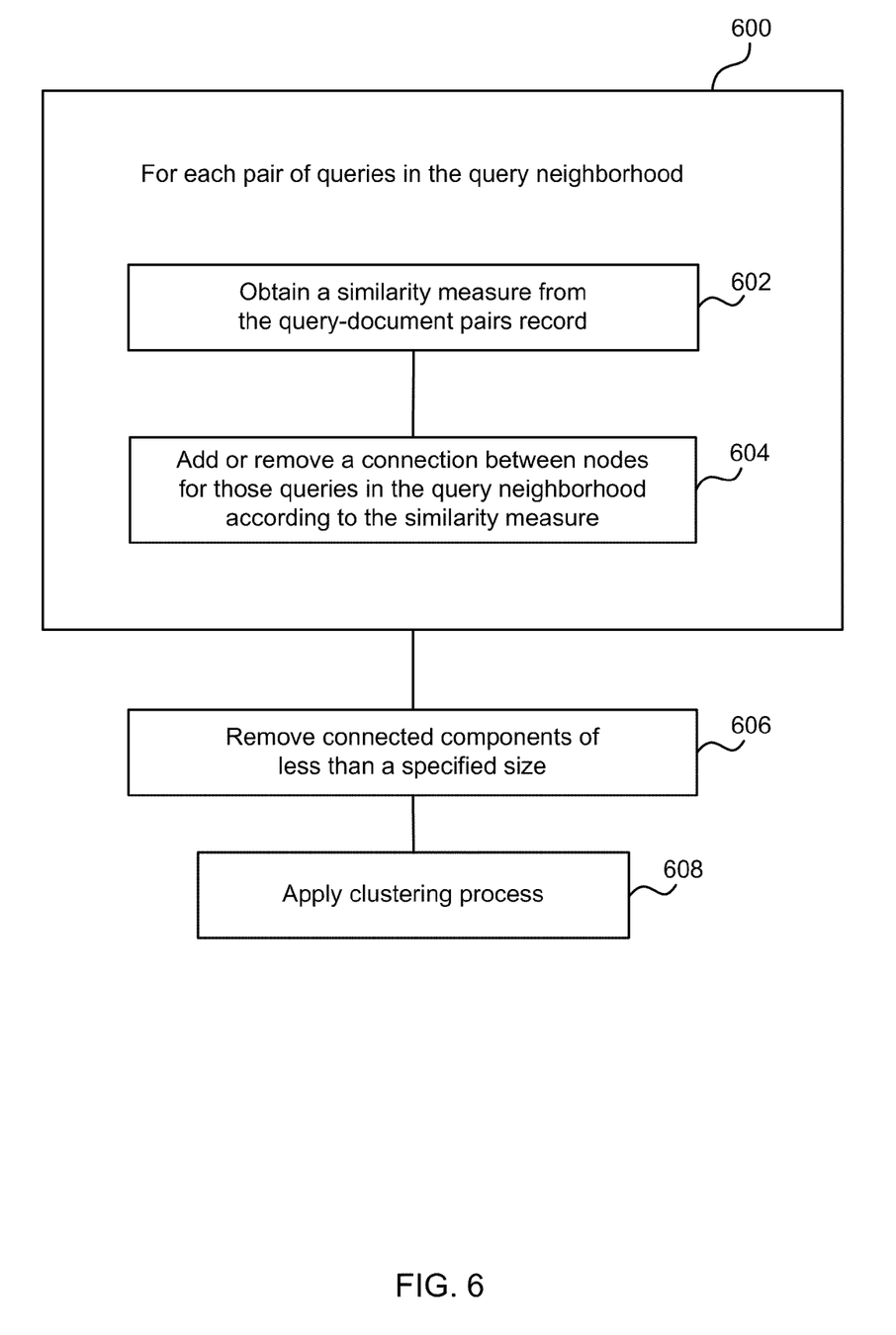
FIG. 6 is a flow diagram of filtering a query neighborhood using similarity.

FIG. 6 is a flow diagram of filtering the query neighborhood using similarity. For each pair of queries 600 in the query neighborhood a similarity measure is obtained 602 from the query-document pairs record. A connection between nodes for the queries in the query neighborhood is added or removed 604 according to the similarity measure.

Optionally connected components of less than a specified size are removed 606 and a clustering process 608 may be applied. For example two queries are connected if they are regularly clicked for the same documents. In an example a random walk on a bipartite query-document click graph can be used and all pairs with a random walk similarity above a fixed threshold are connected. This may add links not present in the query neighborhood. Other links may be removed. Additionally all connected components of a size less than n can be removed completely. For example, n may be 2 or any other suitable integer depending on the application domain concerned.

More detail about the process of forming a query-document click graph is now given. As mentioned above, the click graph is based on a bipartite graph comprising nodes connected by edges. It is formed from two types of nodes: nodes representing queries and nodes representing documents. An edge connects a query and a document if one or more clicks have been observed for that query-document pair by any user. The edge may be weighted according to the total number of clicks from all users although this is not essential. For example, a one-step transition probability may be specified for each edge. These one-step transition probabilities may be related to the total number of clicks from all users for a given edge and may be normalized for click counts out of a given node. In other examples, the one-step transition probabilities may be divided equally between each edge extending from a given node so that those probabilities sum to 1. It is also possible to specify the one-step transition probabilities using a combination of these two methods.

In some embodiments it is possible to have an edge connecting a node to itself to represent a self-transition. Self-transitions allow a random walk process to stay in place. For example, this corresponds to a user preferring a current query or document and not changing it for a step.

In an example, D is the set of documents and Q is the set of queries. A graph is constructed whose nodes V are the union of these, $V=D \cup Q$. The edges ϵ correspond to user clicks, optionally with weights given by click counts $C_{jk}$, associating node j to k.

The probability of making a transition from node j to node k is specified as $P_{t+1|t}(k|j)$ and is determined by normalizing the click counts out of node j, so $$P_{t+1|t}(k|j) = C_{jk} \Big/ \sum_i C_{ji},$$

where i ranges over all nodes. The notation $P_{t_2|t_1}(k|j)$ will denote the transition probability from node j at step $t_1$ to node k at time step $t_2$. While the counts $C_{jk}$ are symmetric, the transition probabilities $P_{t+1|t}(k|j)$ generally are not, because the normalisation varies across nodes. However, it is not essential to use click counts to determine the transition probabilities. Instead the transition probabilities may be divided equally between each edge extending from a given node so that those probabilities sum to 1.

The original click edges form a bipartite graph, and in some embodiments this is extended by adding self-transitions to the nodes. Let the self-transition probability be s. Then the transition probabilities become $$P_{t+1|t}(k|j) = \begin{cases} (1-s)C_{jk} \Big/ \sum_i C_{ji} & \forall k \neq j \\ s & \text{when } k = j. \end{cases} \quad (1)$$

Self-transitions allow the random walk to stay in place, and reinforce the importance of the starting point by slowing diffusion to other nodes. In query formulation terms, this corresponds to the user favouring the current query or document, and not changing it for a step.

The one-step transition probabilities may be arranged as a matrix A whose j, k-th entry is $P_{t+1|t}(k|j)$. The matrix A is row stochastic so that rows sum to 1.

In some embodiments the measure of similarity obtained 602 from the query-document pairs record is based on a random walk process. In an example the random walk comprises calculating the probability of transitioning from node j to node k in t steps, denoted $P_{t|0}(k|j)$, and equal to $P_{t|0}(k|j)=[A^t]_{jk}$.

This random walk sums the probabilities of all paths of length t between the two nodes. It gives a measure of the volume of paths between these two nodes; if there are many paths the transition probability is higher.

In the example described above the random walk process is a forward random walk and it comprises summing the probabilities of all paths of length t between two nodes. It is also possible to use variants on this random walk process. For example, the probabilities may be combined in other ways besides summation, one could use only the probability of the most likely path; or the first passage time of the random walk; graph conductance, or any other property of the random walk.

The random walks may be computed in any suitable manner. In some embodiments these are computed in an efficient manner as follows (although this is not essential). Using this type of efficient computation makes it more practical to deal with large click records having terabytes of information.

The one-step transition probabilities are represented as a sparse matrix A. To calculate a forward random walk the start distribution is encoded as a row vector $v_j$ with a unit entry at query node j and zero elsewhere, to obtain $P_{t|0}(k|j)=[(((v_j A)A)\ldots)A]_k$.

Figure 7:
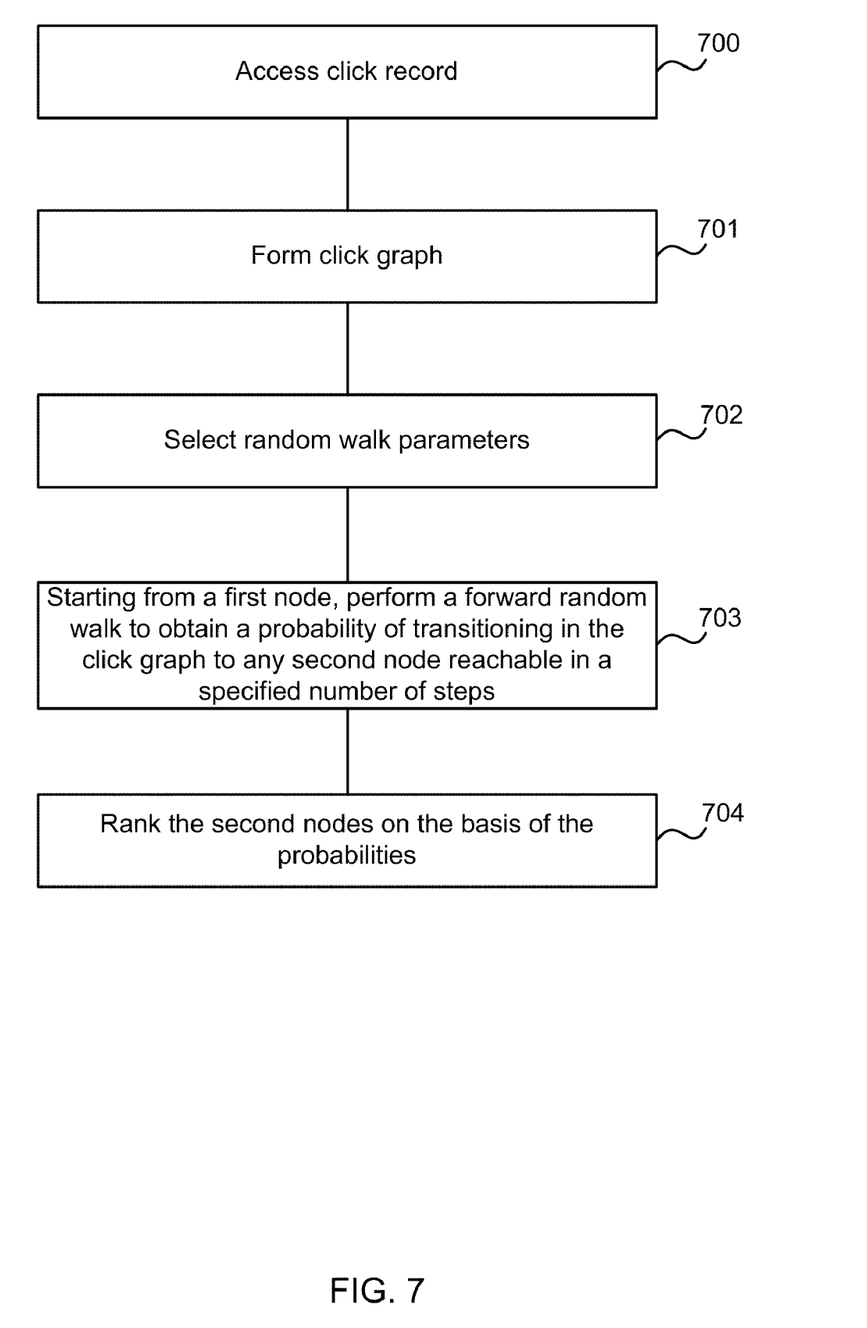
FIG. 7 is a flow diagram of an example method of information retrieval using a forward random walk

Carrying out a forward random walk process is now described with reference to FIG. 7.

A click record is accessed 700 and a click graph is formed 701 as described above. Random walk parameters are then selected 702 as described below and a forward random walk is carried out. For example, these random walk parameters include a path length t and one-step transition probabilities stored in a transition probability matrix A. A self-transition parameter may also be specified in the case that self-transitions are included in the click graph. Starting from a first node, a forward random walk is performed to obtain a probability of transitioning in the click graph to any reachable second nodes in the specified number of steps t, being the path length 703. Documents (or queries) corresponding to the second nodes may then be ranked on the basis of the transition probabilities determined in the forward random walk process 704. This rank information may then be used by an index generator or other component of an information retrieval system. The rank information is thus obtained without the need to consider content of the documents or to consider content of the queries. Also, the rank information includes information about relevant documents (or queries) which have not yet been clicked for the particular query (or document).

In the case that the random walk process combines the probabilities of paths, this process can be thought of as giving a measure of a volume of paths between two nodes. If there are many paths between two nodes the resulting transition probability is high. For example, consider nodes A and B of FIG. 5. Here document nodes A and B are equidistant from query node "panda" 500 that distance being 3 edges. The random walk process described herein may sum over paths so that document node A benefits from having 4 distinct paths of length 3. In contrast, document node B has one distinct path of length 3. Thus document node A achieves a higher transition probability than document node B and is considered more relevant to the query "panda".

The random walk process is also beneficial as it implicitly finds clusters of nodes since multiple weighted paths in the click graph are considered and, as the walk gets longer, is more likely to find second nodes which are in the same cluster as the first node rather than in different clusters from the first node. This improves the ability of the process to find relevant nodes in the click graph even though many irrelevant nodes may be present in the click graph relatively nearby the start node. For example, the random walk process implicitly performs a soft clustering of nodes. As the walk gets longer, the identity of nodes in clusters blurs together. Given an end node that is part of a cluster, there are similar probabilities of having started the walk from any node in the cluster, but lower probability for nodes outside the cluster. The clusters do not have hard boundaries, and a ranking of nodes is still retained for finite walks, as the start point probabilities do not become exactly equal. Clustering may also suppress the effect of spurious edges that may be due to noise.

As mentioned above random walk parameter values are set in advance of carrying out the random walk process. For example, these parameters may comprise a transition probability matrix and a path length or number of steps in the walk.

The transition probability matrix for one-step transitions may be specified as mentioned above and by normalizing the click counts out of each node. Alternatively, the one-step transition probabilities may be divided equally between each edge extending from a given node so that those probabilities sum to 1. For example, using the following equation:

$$P_{t+1|t}(k \mid j) = \begin{cases} C_{jk} / \sum_i C_{ji} & \forall j \in Q \\ P_{t+1|t}(j \mid k) / \sum_k P_{t+1|t}(j \mid k) & \forall j \in D \end{cases} \quad (2)$$

In this case some transitions are normalized by probability rather than by click count. In an example transitions from documents to queries are invariant to the popularity (absolute click counts) of queries. In other embodiments both absolute and relative click-counts may be used to specify the one-step transition probabilities.

The number of steps in the walk can be thought of as determining a resolution of the walk. For example, a short walk preserves information about a starting node at a fine scale. For example, start nodes close to the end node have much higher probability than other nodes, and nodes further away cannot even be reached and have zero probability. A long walk may be though of as preserving only coarse information about any cluster of nodes the walk began from. Using this information the number of steps in the walk may be configured by an operator or may be set to a default value.

In other embodiments the number of steps in the walk (also the path length t) is selected heuristically based on the diameter of connected components in the graph. For example, the walk length may be set to be t for nodes that are part of a connected component of diameter t.

In other embodiments the number of steps in the walk is selected on the basis of a mixing time of the click graph. The mixing time of a click graph measures the time it takes to approach the stationary distribution and the stationary distribution represents the situation when all information about the starting node (document or query) is lost. The number of steps in the walk is then selected so that the stationary distribution is not reached.

In other embodiments the number of steps in the walk is selected on the basis of a combination of information about the diameter of a singly connected graph and information about mixing time of the graph.

A self-transition parameter value (which is a probability value) may also be set. This influences how quickly the random walk diffuses. For example, a self-transition probability close to 1 corresponds to a slow walk, which mostly stays at the same node. Such a walk requires a large number of steps before other nodes accumulate any significant probability. For example, a self-transition probability close to 0 corresponds to a fast walk which forces a change of node at each step.

It is also possible to use a decaying exponential distribution over walk lengths when setting the self-transition parameter. This puts more emphasis on shorter walks but still includes arbitrarily long walks.

The information retrieval methods described herein may be extended by allowing any clicks made on the information retrieval results to be used to update the click graph. In this way new edges in the click graph may result and over time, sparsity in the click graph may reduce. The updates may be made dynamically during use of the information retrieval system and/or may be made offline on a periodic basis.

Figure 8:
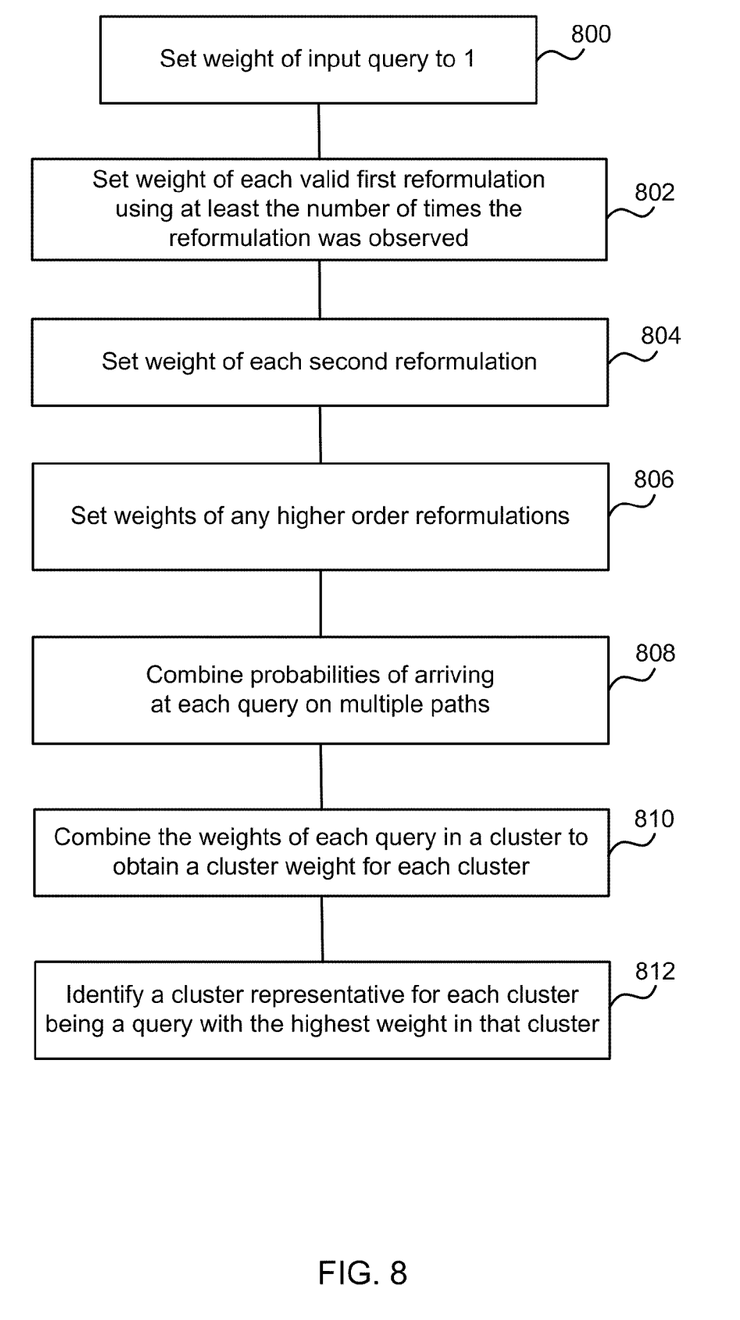
FIG. 8 is a flow diagram of an example method of applying weights to query clusters.

FIG. 8 is a flow diagram of an example method of assigning weights to query clusters which may be implemented at the query intent inference engine 110. To assign an importance to each intent cluster the sum of random walks on the reformulation graph can be used. The weight $w_q$ of the input query q is set 800 to $w_q=1$. The weight of every valid first reformulation q' is set 802 using at least the number of times the reformulation was observed. In an example the weight of each valid reformulation q' of q can be given by $w'_q = w_q N(q \rightarrow q') / \Sigma_{r \in R(q)} N(q \rightarrow r)$ where $N(q \rightarrow q')$ is the number of times the reformulation q to q' was observed and R(q) is the set of all q's. In other examples, rather than using the number of times the reformulation was observed to assess the weight (or score) it is possible to use the fraction of times the query was reformulated in the specified way, or the fraction of users who reformulated in this way, or the average time taken to reformulate. The process of determining the weights can be repeated to determine the weights of the second 804 and higher order 806 reformulations. The probabilities of arriving at each query on multiple paths 808 can be combined by summation or any other suitable combination method. The weights of each query in a cluster can be summed or combined in any other way to obtain a cluster weight 810 $w_c$ also known as an importance score. The query with the highest weight $w_q$ in the cluster is taken 812 as a cluster representative.

Figure 9:
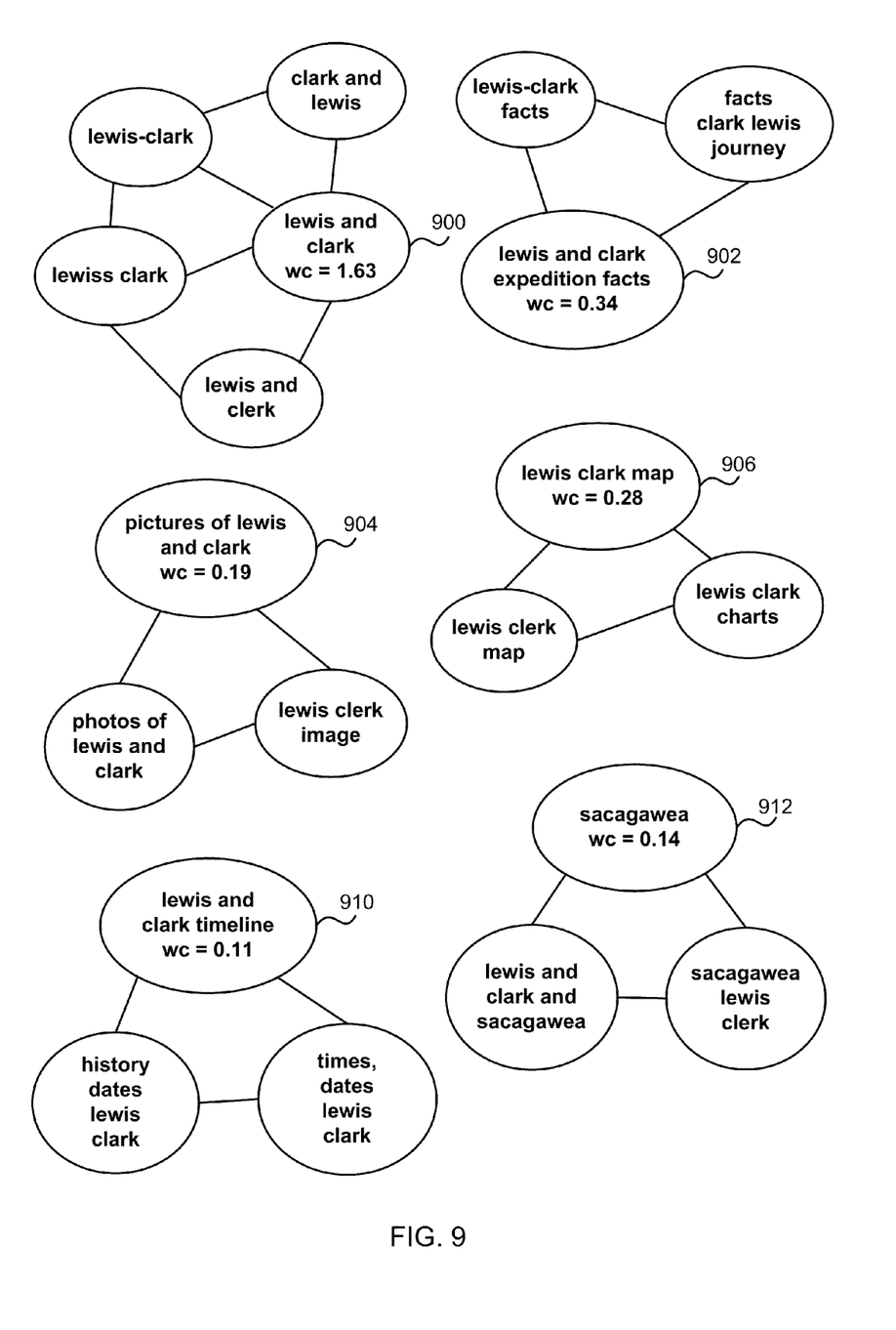
FIG. 9 is a schematic diagram of examples of weighted query clusters.

FIG. 9 is a schematic diagram of examples of weighted query clusters produced by a query intent inference engine. For example users seeking information on the Lewis and Clark expedition may be seeking information on Lewis and Clark 900, Lewis and Clark expedition facts 902, pictures 904 of Lewis and Clark, Lewis and Clark maps 906, a Lewis and Clark timeline 910 or information on the related American Indian Sacagawea 912. In an example the reformulations and query-document click graph can be used to formulate clusters and the summation of weights of the queries in each cluster can be used to form a cluster weight $w_c$. The weight of each cluster can be used as an indication of the likelihood that the representative query is indicative of the intent of the users original query.

In an embodiment the weighting $w_c$, of each cluster can be used in order to rank search results such that the most relevant search results are listed first. In another embodiment the weighting $w_c$, of each cluster can be used to rank keywords in a keyword auction.

Figure 10:
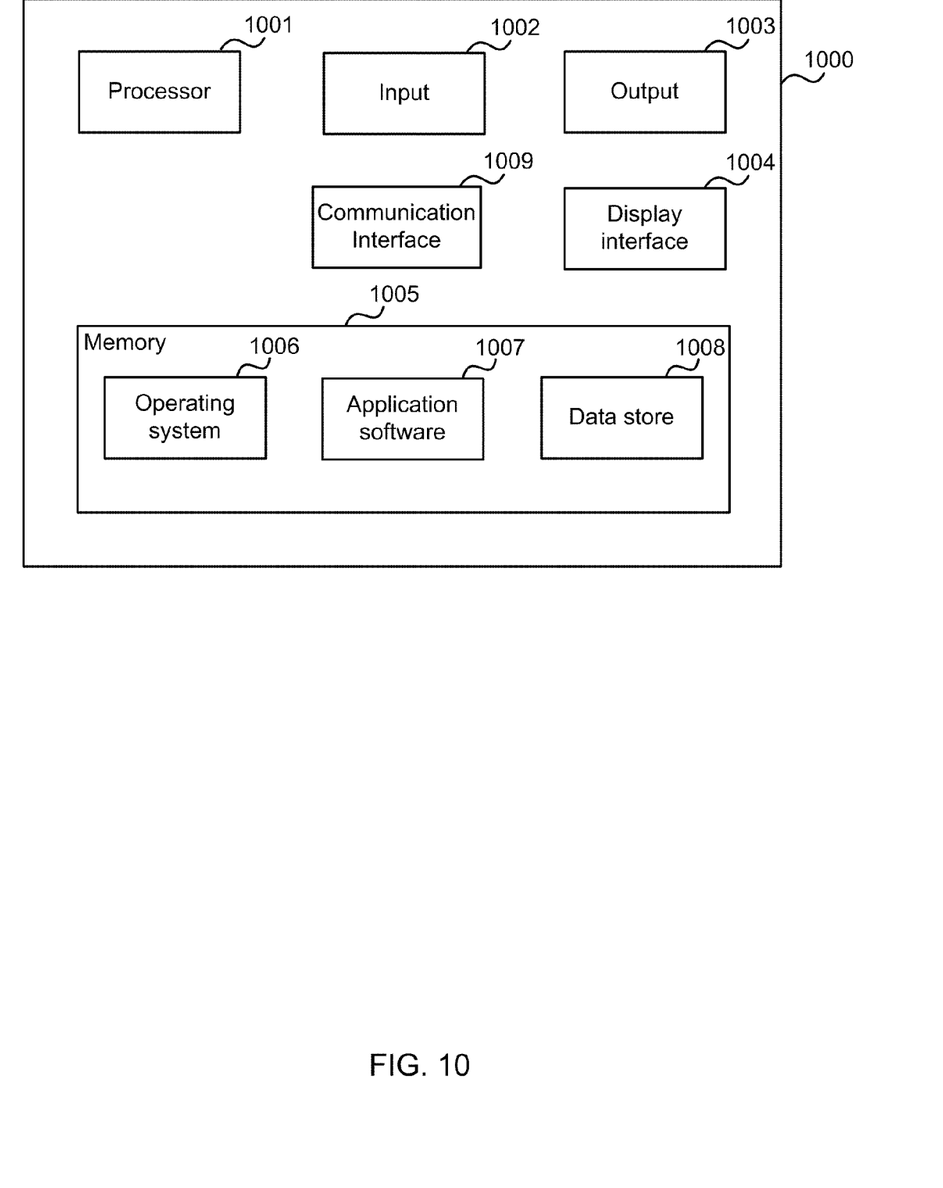
FIG. 10 illustrates an exemplary computing-based device in which embodiments of an information retrieval system may be implemented.

FIG. 10 illustrates various components of an exemplary computing-based device 1000 which may be implemented as any form of a computing and/or electronic device, and in which embodiments of a query intent inference engine or an information retrieval system incorporating such an engine may be implemented.

The computing-based device 1000 comprises one or more inputs 1002 which are of any suitable type for receiving media content, Internet Protocol (IP) input, input from click records, query reformulation records, query-document pair records, information retrieval related input and other input. The device also comprises communication interface 1009 for example, for communicating with end-user devices, a web-based search engine or other information retrieval engine, or any other entity over a communications network.

Computing-based device 1000 also comprises one or more processors 1001 which may be microprocessors, controllers or any other suitable type of processors for processing computing executable instructions to control the operation of the device in order to carry out information retrieval. Platform software comprising an operating system 1006 or any other suitable platform software may be provided at the computing-based device to enable application software 1007 to be executed on the device.

The computer executable instructions may be provided using any computer-readable media that is accessible by computing based device 1000. Computer-readable media may include, for example, computer storage media such as memory 1005 and communications media. Computer storage media, such as memory 1005, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 1005) is shown within the computing-based device 1000 it will be appreciated that the storage may be distributed or located remotely and accessed via a network or other communication link (e.g. using communication interface 1009).

An output 1003 is also provided such as an audio and/or video output to a display system integral with or in communication with the computing-based device. The display system may provide a graphical user interface, or other user interface of any suitable type although this is not essential. For example a display interface 1004 may be provided such as a web-based display interface or other display interface. Memory 1005 may also comprise a data store 1008 for storing graph data structure such as click graphs, query neighborhoods and reformulation graphs or any other data.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method for use at a search engine arranged to receive queries and to provide search results for those queries, the search results comprising links to documents, the method comprising:
   receiving a query;
   accessing query reformulation data and using that data to create a query neighborhood around the received query, the query neighborhood being a graph data structure in memory comprising a node representing the received query and links connecting that node to other nodes representing-observed reformulations of that query;
   accessing evidence about queries related to the received query comprising a record of query-document pairs;
   using a processor to filter the query neighborhood by editing the graph data structure on the basis of the accessed evidence to produce and store in memory a reformulation graph;
   assigning weights to the reformulations in the reformulation graph using a random walk process that takes into account at least the number of times each reformulation was observed;
   clustering the nodes in the reformulation graph using the assigned weights;
   combining the weights of the queries in each cluster to obtain an importance score for that cluster; and
   using the reformulation graph to identify queries related to the received query.

2. A method as claimed in claim 1, wherein accessing the evidence comprises accessing the record of query-document pairs which includes a click graph comprising nodes connected by edges, each node representing any of a document and a query and each edge representing at least one observed user click action.

3. A method as claimed in claim 2, wherein filtering the query neighborhood further comprises identifying pairs of queries with a random walk similarity in the click graph that is above a threshold.

4. A method as claimed in claim 1, wherein accessing query reformulation data comprises accessing a record of valid reformulations, each valid reformulation being a query made by each of at least two distinct users, followed within a specified time period, by another query which is the same for each user.

5. A method as claimed in claim 1, which further comprises editing the reformulation graph to remove a connected group of nodes where a number of nodes in the removed group of nodes is smaller than a specified size.

6. A method as claimed in claim 1, wherein accessing query reformulation data comprises accessing a record of queries which has been filtered to remove frequent queries.

7. A method as claimed in claim 1, wherein filtering the query neighborhood further comprises adding or removing links in the graph data structure such that only pairs of queries with a similarity above a threshold are connected, the similarity being measured using the record of query-document pairs.

8. A method as claimed in claim 7, which further comprises measuring the similarity of pairs of queries using a random walk on the graph data structure.

9. A method as claimed in claim 1, wherein the queries are advertisement key words and wherein the method comprises providing the identified queries as advertisement key word suggestions to an advertisement system.

10. A method as claimed in claim 1 further comprising providing the identified queries as query suggestions to a user of the search engine.

11. One or more computer-readable storage media, the one or more computer-readable storage media not being signals per se, having recorded thereon computer-executable instructions to configure the one or more processors to perform the method of claim 1.

12. A query generation apparatus comprising:
an input arranged to receive a query to be issued to a search engine to retrieve documents;
a memory holding:
query reformulation data comprising records of semantically related queries seeking related information;
a query neighborhood for the received query based at least in part on the query reformulation data, the query neighborhood being a graph data structure comprising:
a node representing the received query;
a plurality of other nodes comprising observed reformulations of the received query; and
links connecting the node to the plurality of other nodes;
a processor arranged to:
access a record of query-document pairs comprising observed relationships between queries and documents;
filter the query neighborhood editing the graph data structure based at least in part on the record of query-document pairs to produce a reformulation graph;
use the reformulation graph to generate queries related to the received query;
assign weights to the observed reformulations in the reformulation graph using a random walk process based at least in part on the number of times each reformulation was observed;
cluster the nodes in the reformulation graph using the assigned weights; and
combine the weights of the reformulations in each cluster to obtain an importance score for that cluster.

13. An apparatus as claimed in claim 12, which is integral with the search engine and wherein the search engine is arranged to produce the record of query-document pairs and to observe the reformulations of the query.

14. An apparatus as claimed in claim 12, wherein the queries are advertisement key words.

15. A method comprising:
receiving a query;
accessing query reformulation data comprising records of semantically related queries seeking related information;
creating a query neighborhood based at least in part on the received query and the query reformulation data, wherein the query neighborhood comprises a graph data structure stored in memory comprising:
a node representing the received query,
a plurality of other nodes comprising observed reformulations of the received query; and
links connecting the node to the plurality of other nodes;
accessing a click graph comprising nodes connected by edges, each node representing any of a document and a query and each edge representing at least one observed click;
using a processor to filter the query neighborhood comprising editing the graph data structure based at least in part on the click graph to produce and store in memory a reformulation graph;
using the reformulation graph to identify queries related to the received query; and
assigning weights to the observed reformulations in the reformulation graph using a random walk process based at least in part on the number of times each reformulation was observed;
clustering the nodes in the reformulation graph using the assigned weights; and
combining the weights of the reformulations in each cluster to obtain an importance score for that cluster.

16. A method as claimed in claim 15, wherein filtering the query neighborhood further comprises computing similarities between pairs of queries in the click graph using a random walk.

17. A method as claimed in claim 15, which comprises editing the reformulation graph to remove connected groups of nodes where a number of nodes in the removed group of nodes is smaller than a specified size.

18. One or more computer-readable storage media, the one or more computer-readable storage media not being signals per se, having recorded thereon computer-executable instructions to configure the one or more processors to perform the method of claim 15.

* * * * *